United States Patent
Merz

(10) Patent No.: US 7,020,962 B2
(45) Date of Patent: Apr. 4, 2006

(54) METHOD FOR PRODUCING A CAM FOR A CAMSHAFT

(76) Inventor: Karl Merz, Hohenweg 14, 5734 Reinach (CH)

( * ) Notice: Subject to any disclaimer, the term of this patent is extended or adjusted under 35 U.S.C. 154(b) by 294 days.

(21) Appl. No.: 10/311,669

(22) PCT Filed: Jun. 22, 2001

(86) PCT No.: PCT/CH01/00390

§ 371 (c)(1),
(2), (4) Date: Apr. 16, 2003

(87) PCT Pub. No.: WO01/98020

PCT Pub. Date: Dec. 27, 2001

(65) Prior Publication Data

US 2004/0016121 A1  Jan. 29, 2004

(30) Foreign Application Priority Data

Jun. 23, 2000 (CH) ................... 1248/00

(51) Int. Cl.
*B21K 1/12* (2006.01)
(52) U.S. Cl. .............. 29/888.1; 74/567; 123/90.6
(58) Field of Classification Search ............ 29/888.1; 74/567; 123/90.6
See application file for complete search history.

(56) References Cited

U.S. PATENT DOCUMENTS

| 3,609,276 | A | * | 9/1971 | Cavagnero et al. ........... 219/64 |
| 3,999,277 | A | * | 12/1976 | Hamada ................... 29/447 |
| 4,620,356 | A | | 11/1986 | Maus et al. |
| 4,798,178 | A | | 1/1989 | Greulich et al. |
| 4,977,793 | A | * | 12/1990 | Husted ..................... 74/567 |
| 5,299,881 | A | * | 4/1994 | Mettler-Friedli ........... 403/274 |
| 6,510,762 | B1 | * | 1/2003 | Beier et al. ................ 74/567 |
| 6,718,924 | B1 | * | 4/2004 | Isaacs et al. ............. 123/90.6 |

FOREIGN PATENT DOCUMENTS

| DE | 2914095 | * 10/1980 |
| DE | 3431361 A1 | 3/1986 |
| DE | 4324836 A1 | 1/1995 |
| DE | 4437399 A1 | 4/1996 |
| DE | 19740323 A1 | 3/1999 |
| EP | 0509239 A1 | 10/1992 |
| GB | 275842 | 8/1927 |
| GB | 1117816 | 6/1968 |
| JP | 59064187 | 4/1984 |
| JP | 03194105 | 8/1991 |
| JP | 05-285576 | * 11/1993 |
| JP | 09303639 | 9/1997 |
| WO | WO9627076 A1 | 9/1996 |
| WO | WO0198020 A1 | 12/2001 |

OTHER PUBLICATIONS

DE 3431361 Derwent English Abstract.*

* cited by examiner

*Primary Examiner*—Eric Compton
(74) *Attorney, Agent, or Firm*—Tarolli, Sundheim, Covell & Tummino L.L.P.

(57) ABSTRACT

The invention relates to a method for producing cams (1) for a camshaft. The cams are produced by bending together the ends of long profile strips (4) or by bending and putting together several pieces of profile strips in a circumferential direction. Cams produced in such a way are preferably welded onto the shaft. The invention also relates to suitable welding methods such as resistance welding, laser-beam or electron-beam welding and corresponding devices.

53 Claims, 7 Drawing Sheets

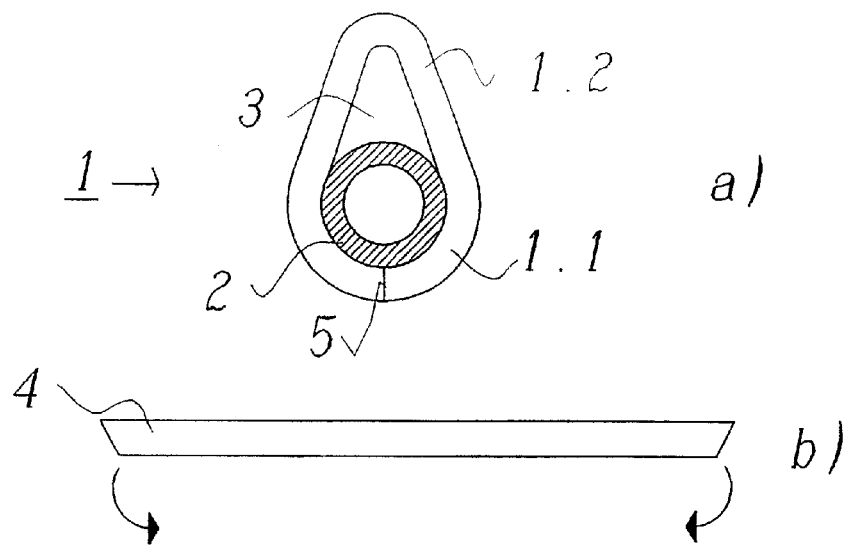
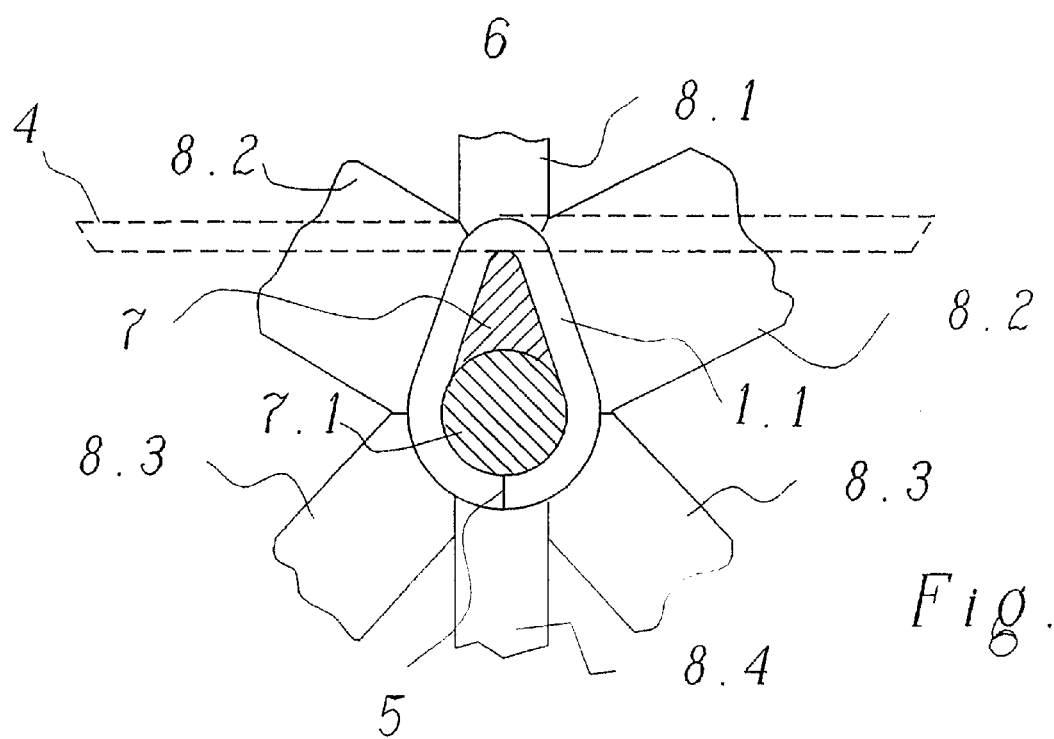

METHOD FOR PRODUCING A CAM FOR A CAMSHAFT

TECHNICAL FIELD

The present invention relates to a method for producing a cam for a camshaft, such as is used, for example, in internal combustion engines for automobiles, with a cylindrical shaft and with a plurality of cams fixed on the latter.

Camshafts of this type, assembled from a plurality of individual parts, are used increasingly instead of camshafts produced by casting or forging.

The invention relates, further, to the production of a camshaft, using at least one cam of the novel type described below here.

PRIOR ART

In the production of cams for camshafts, normally blanks are first obtained by a rod-shaped solid material being cut to length. Only then is the passage orifice for the shaft produced in these. Finally, usually also axially oriented grooves are reamed out in the passage orifice and the outer surface of the cams is hardened.

To fix the usually plurality of cams on the shaft, various methods are known in the prior art:

In a first such method, the shaft is provided in the region of the cams with a rolled-on zero-pitch thread projecting beyond the shaft diameter.

When the cams are pressed onto the shaft, a form-locking connection is obtained between this thread and said axial grooves of the cams, in that the two contours catch one in the other. However, the method has various disadvantages:

During rolling, the shafts are lengthened and bent to a considerable extent. Each shaft therefore subsequently has to be shortened to its desired dimension and the bending eliminated again by straightening. The bearing points of the shafts can be ground to the final dimension only after the cams have been pressed on. The tolerances which occur have to be taken into account by means of an overdimension of at least 0.5 mm.

The cams are deformed when being pressed on, and this so-called cam growth varies and cannot be controlled easily. This also necessitates a remachining of each individual cam by grinding. In this case, depending on the deformation of the cam, there is a material removal which is uneven over the circumference of the latter. A previously inductively generated surface hardening zone of uniform thickness thereby acquires an uneven thickness. Since a minimum thickness is usually prescribed for this hardening zone, it, too, has to be overdimensioned from the outset.

When the cams are being pressed on, it may happen that they tilt somewhat, because said groove systems do not necessarily provide a straight fit of the cams on the shaft. The cams then wobble somewhat. In addition, that edge of their orifice which is at the front in the press-on direction is always provided with a chamfer, and this somewhat shortens the axial length of the cams which is important for the orientation and fit of the cams. These tolerances, too, have to be taken into account by means of a sufficient oversize and subsequently eliminated again by grinding.

When the cams are pressed on forcibly, there is the risk of the formation of cracks in the cams, this having the effect of a reject source.

Production is highly time-intensive due to the many necessary machining steps and the considerable degree of remachining after the cams have been pressed on.

In another method, a shrink fit is produced between the cams and the shaft. In this case, the selected orifice of the cams has a somewhat smaller diameter than the outside diameter of the shaft. The cams are then pushed in the heated state onto the refrigerated shaft. After the equalization in temperature of the parts, the desired shrink fit is obtained. However, this is usually not sufficiently firm to withstand the torques which occur, for example, on the cams in an automobile engine. Intermeshing, similar to that in the methods described above, is therefore usually necessary in addition.

In a further method, the shaft designed as a tube is acted upon by an internal high pressure after the cams have been pushed on, with the result that said shaft expands and a press fit of the cams on the shaft is thereby likewise obtained. Since the shaft expands even beyond the inside diameter of the cams in the region between the cams, it is necessary, even here, at least for the bearing points arranged in these zones to be remachined considerably by grinding.

PRESENTATION OF THE INVENTION

The set object of the present invention is, in the first place, to specify a method for producing a cam of the type initially mentioned, by means of which cams for camshafts can be produced, in particular, more quickly and more cost-effectively, along with sufficient strength. According to the invention, this object is achieved by means of a cam, such as is defined in patent claim 1, and in which the cam is produced from an elongate profile strip by the ends of the latter being bent together or else from a plurality of profile strip pieces by these pieces being bent and assembled in a circumferential direction.

The set object of the invention is, further, to specify a method for producing a camshaft, using at least one such cam, which can be executed likewise efficiently and more quickly, in which remachining steps may essentially be dispensed with and which is thereby, overall, more economical. This object is achieved, according to patent claim 15, in that the cam is fixed on the shaft by welding.

Advantageous and therefore preferred refinements and developments of the subjects of the invention are specified in each case in the dependent claims.

The advantages achieved by means of the invention are, above all, to be seen in the following:

The production of the cams is as simple, efficient, quick and economical as possible and can be carried out, fully automated, starting from one or else a plurality of simple profile strips which, if appropriate, are somewhat preformed and are preferably cut to length from a continuous material.

If the cams are fixed on the shaft by welding, in particular by resistance, laser or electron-beam welding, by the method according to the invention, rolling of the shafts is avoided and there is therefore also no growth in length of the shafts and no bending caused thereby. The cams also do not experience any cam growth when being applied to and welded to the shafts, so that both the shafts and the cams, even before being assembled, can be machined to their respective final dimension or at least approximately, with the exception of only a few hundredths of a millimeter (near endshape), to their final dimension. Complicated remachining by grinding is avoided or is reduced to a minimum amount. As a result, the shafts and the cams do not have to be at least appreciably overdimensioned before they are connected. Since an unequal removal of surface hardening zones is also avoided, these, too, do not have to be at least appreciably overdimensioned.

As compared with the camshafts previously known, the camshafts which are obtained can be produced in a shorter time, using fewer operations, in particular with less remachining, with high accuracy and with a low reject rate, extremely efficiently and cost-effectively.

There is great freedom in the choice of materials for the shafts, on the one hand, and for the cams, on the other hand, and also the highest possible flexibility in terms of construction methods.

BRIEF EXPLANATION OF THE FIGURES

The invention will be explained in more detail below with reference to exemplary embodiments, in conjunction with the drawing in which:

FIG. 1 shows, in each case in a side view under a), a cam according to the invention, produced from a bent profile strip, on a shaft, the shaft being cut across, and, under b), the still straight profile strip before bending together;

FIG. 2 shows diagrammatically a bending tool with a cam contained in it;

EMBODIMENTS OF THE INVENTION

Figure 3:
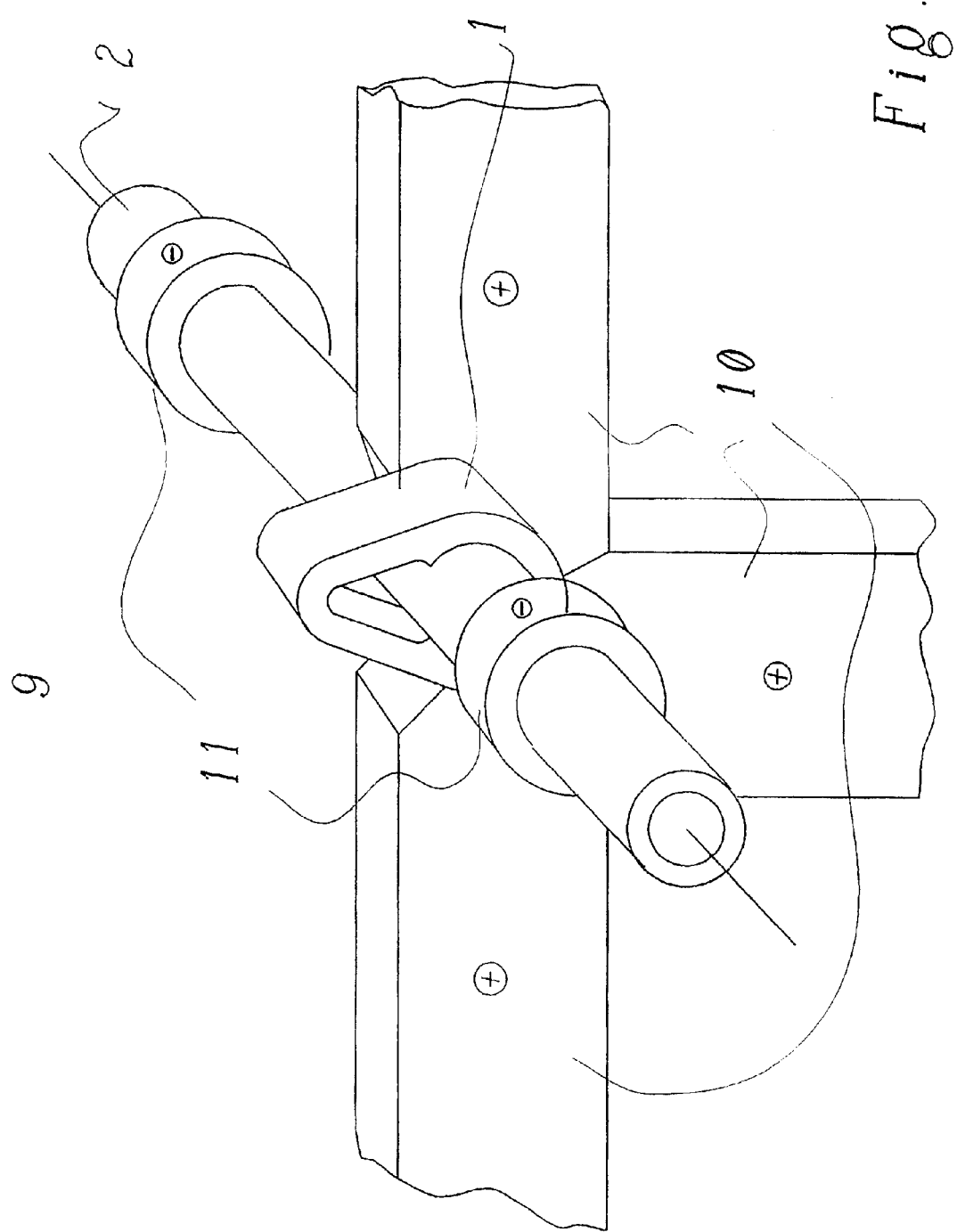
FIG. 3 shows a resistance welding arrangement for fixing cams on a shaft.

In FIG. 1, under a), 1 designates a cam according to the invention which is fastened on a hollow-cylindrical shaft 2. The cam 1 has a first portion 1.1, along which it is in bearing contact on the shaft 2 and partially surrounds the latter, and a second portion 1.2 which projects from the shaft and surrounds a cavity 3. The cavity 3 has the advantage that it makes the cam 1 lighter and reduces its moment of inertia. The weight of the entire camshaft and its rotational resistance are thereby also reduced.

The cam 1 is produced from a profile strip by its ends being bent together. Such a profile strip 4 is shown in FIG. 1 under b), the profile strip 4 still being straight and unbent here. The bending direction of the profile strip 4 is indicated by arrows.

Preferably, the profile strip 4 is bent in such a way that, after bending, its ends form a butt joint 5 and its end faces butt against one another over their area. For this purpose, it may be advantageous to bevel the ends before bending, as is also illustrated in FIG. 1b).

Preferably, the profile strip 4 is cut to length from a continuous material. The thickness of the profile strip 4 is preferably between 5 and 15 mm. It could have a uniform, but also a variable thickness over its length, so that, for example, the portion 1.1 of the cam 1 is thicker than its portion 1.2, or vice versa.

FIG. 2 shows a cam 1 in a bending tool 6, such as can be used advantageously for producing it. The profile strip 4 is in this case bent into its desired final shape by extrusion in a plurality of steps via a bending core 7 by means of a plurality of bending fingers 8.1–8.4. In this case, the still unbent profile strip 4 is first fixed on the bending core 7 at the top by means of the first bending finger 8.1. The second bending fingers 8.2 then bend the profile strip 4 into an approximately V-shaped preform. By means of the third bending fingers 8.3, the profile strip 4 is bent around the bending core 7 at the bottom, and, finally, the ends of the profile strip 4 are closed by means of the fourth bending finger 8.4 to form said butt joint.

In a further work step, the two ends butting against one another may then also be welded to one another, in particular using the resistance, laser or electron-beam welding technique.

The cam 1 thus produced is preferably also fastened on the shaft by welding, in particular, again, using the laser or electron-beam welding technique, but particularly advantageously by resistance welding.

FIG. 3 shows a resistance welding arrangement 9, in which a cam 1 pushed onto a shaft 2 is retained in its desired position and rotary setting by means of three welding tongs/electrodes 10. Two rings 11 clamped onto the shaft 2 form the counterelectrodes. In the current path between the electrodes, the contact faces between the cam 1 and the shaft 2 form the regions with the highest ohmic resistance. By means of a high current pulse, a high stray power can be deposited for a short time in these zones and leads to the desired welding of said contact faces to one another.

If appropriate, in this welding method, it is also possible to weld directly to one another the two ends of the profile strip 4 which butt against one another, with the result that a prior welding of these ends would advantageously be dispensed with.

Since, in this welding method, the cam is clamped between the welding tongs 10, there is also advantageously no need for a possibly complicated prefixing of the cam on the shaft.

In a preferred refinement of the invention, the cam 1 is provided, as illustrated in FIG. 4a), with inwardly projecting, for example axially running ribs 12 on its first portion 1.1. The ribs 12 may even be formed on the still unbent profile strip 4, for example by rolling, as illustrated in FIG. 4b). They could alternatively also be produced only during bending on the bending core 7, in which case part of the bending core would have to be provided with a corresponding surface structure. The two possibilities could also be used in combination with one another. The ribs should have, for example, a height of 0.15–0.16 mm and a spacing of 1.5–2 mm.

The presence of the ribs 12 results in defined sharp contact lines between the cam and the shaft, this being advantageous for current conduction during resistance welding, in that welding takes place along these lines. When a welding device according to FIG. 3 is used, pressure may also, to further advantage, be exerted on the cam during welding by means of the welding tongs 10, in such a way that the ribs 12 are squeezed and the cam 1 comes to bear over its area against the shaft 4. This gives rise to a structure with weld seams 13 of lenticular cross section, as shown in an enlargement of a detail in FIG. 4 under c).

Alternatively, instead of ribs in the axial direction, ribs in the longitudinal direction of the profile strip 4 or in the circumferential direction of the finished cam may also be used. So that, in this case, the bending core 7 can be removed again in a simple way after the bending of the profile strip 4, it is advantageous to design the ribs, on the one hand, and the outer structure on the bending core, on the other hand, in the manner of a thread, in order to make it possible for the bending core to be unscrewed from the cam. For this purpose, as indicated in FIG. 2, the bending core 7 would additionally have to be produced in two parts with a rotatable part 7.1.

Figure 5:
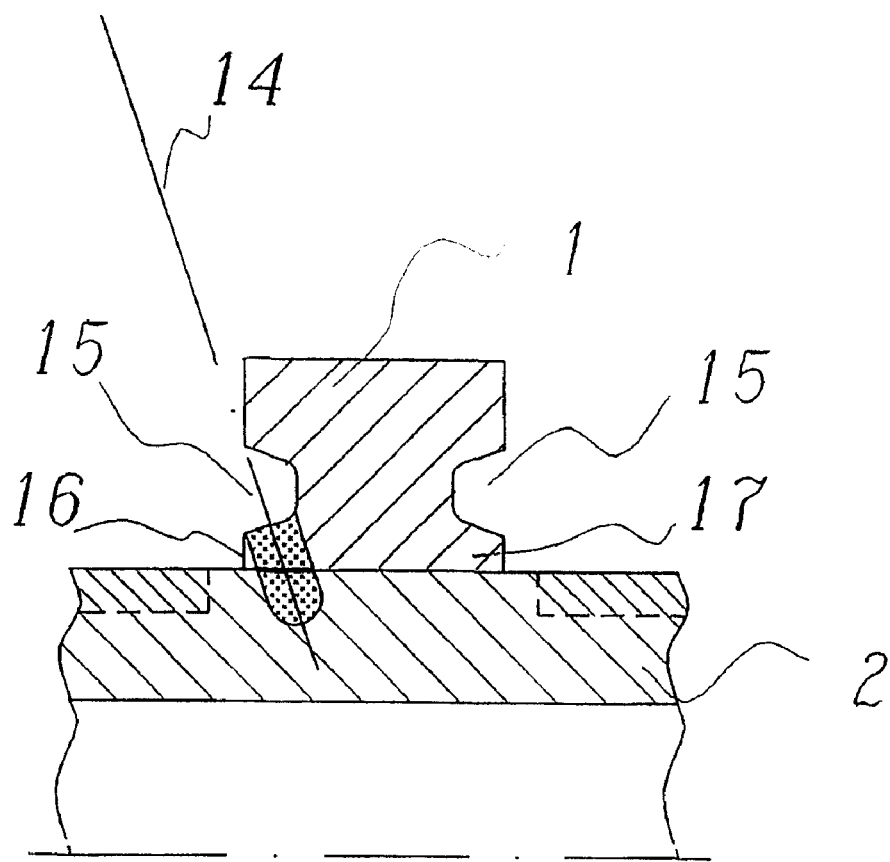
FIG. 5 shows, in section, a cam, provided with a foot strip, on a shaft, the cam being welded to the shaft along the foot strip by means of a laser or electron beam.

FIG. 5 illustrates a cam 1 on a shaft 2, the cam 1 especially advantageously being designed for fastening by welding by means of a laser or electron beam. For this purpose, the cam 1 has, at least on one side, a foot strip 16 which is formed by a groove 15 on its corresponding side face. The cam can be welded, preferably over its circumference, to the shaft 2 along this foot strip 16 and through the latter in a fully orbital manner obliquely from above by means of a laser or electron beam 14. The presence of the foot strip 16 results in a weld seam (welding cone) with a virtually optimum welding cross section, the width of which corresponds approximately to the width of the foot strip 16 and consequently ensures an extremely good, highly load-bearing and permanent connection between the cam 1 and the shaft 2. An identical weld is, of course, also provided, and preferred, along the foot strip 17 on the other side of the cam 1.

The foot strips 16 and 17 may advantageously be produced by forming on the still unbent profile strip 4, on which they are simply straight grooves.

Figure 6:
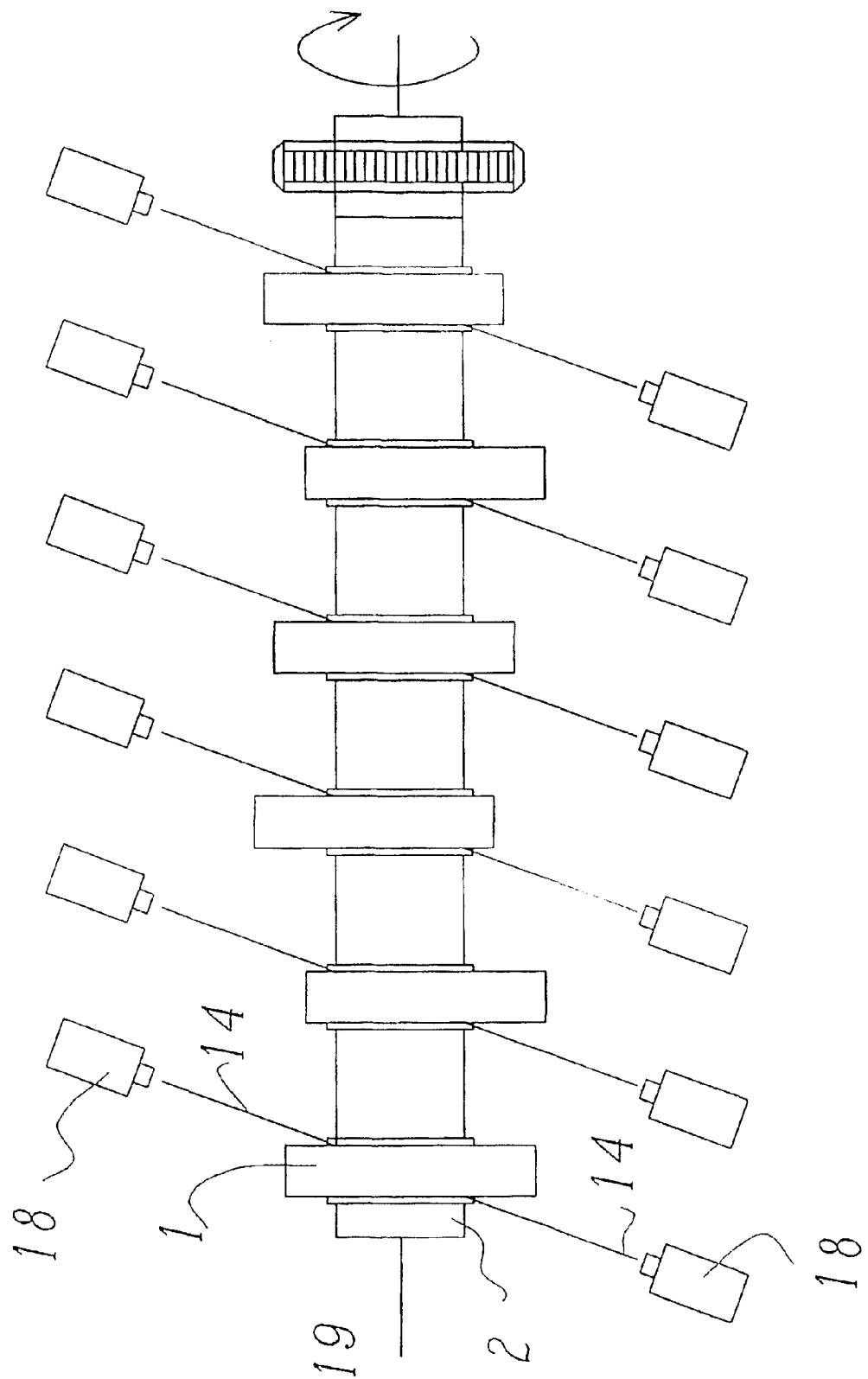
FIG. 6 shows a diagrammatic view of an arrangement for producing a camshaft, with a plurality of laser or electron-beam welding heads.

FIG. 6 shows an arrangement, such as can be used advantageously for the laser or electron-beam welding of cams 1 to a shaft 2. However, FIG. 6 illustrates merely diagrammatically a shaft 2 with a plurality of pushed-on cams 1 and, for each cam 1, two welding heads 18 which may be laser or electron-beam welding heads. The welding heads 18 are oriented in such a way that their welding beams 14 impinge onto the foot strips 16 or 17 of the cams 1. FIG. 6 is to be understood such that the shaft 2 is clamped axially by means, not illustrated, and is rotated about its axis 19 while the welding heads 18 are simultaneously put into operation. It is thereby possible, in an operation lasting for only a few seconds, to fasten all the cams 1 simultaneously on the shaft 2 by welding.

Before the weld seams are applied by means of the device according to FIG. 6, it may be necessary, if appropriate, to prefix the cams 1 on the shaft 2 in their desired position and rotary setting. This may take place, for example, by tacking by welding, but also by means of one or more of the initially explained connection methods according to the prior art, such as a shrink fit, a form-locking connection or internal high pressure. Since the preconnection does not have to be particularly firm and even not at all permanent, the initially outlined disadvantages of the known fastening methods can in this case be avoided.

Due to the welding, the shaft 4 and the cams 1 are subjected to comparatively little stress and therefore advantageously maintain their shape. The heat introduced locally into the shaft 2 and the cams 1 as a result of welding can, in the case of a tubular shaft, additionally even be discharged, for example, by a cooling medium being conveyed through the shaft, thus further reducing the possible impairment of the parts.

Figure 7:
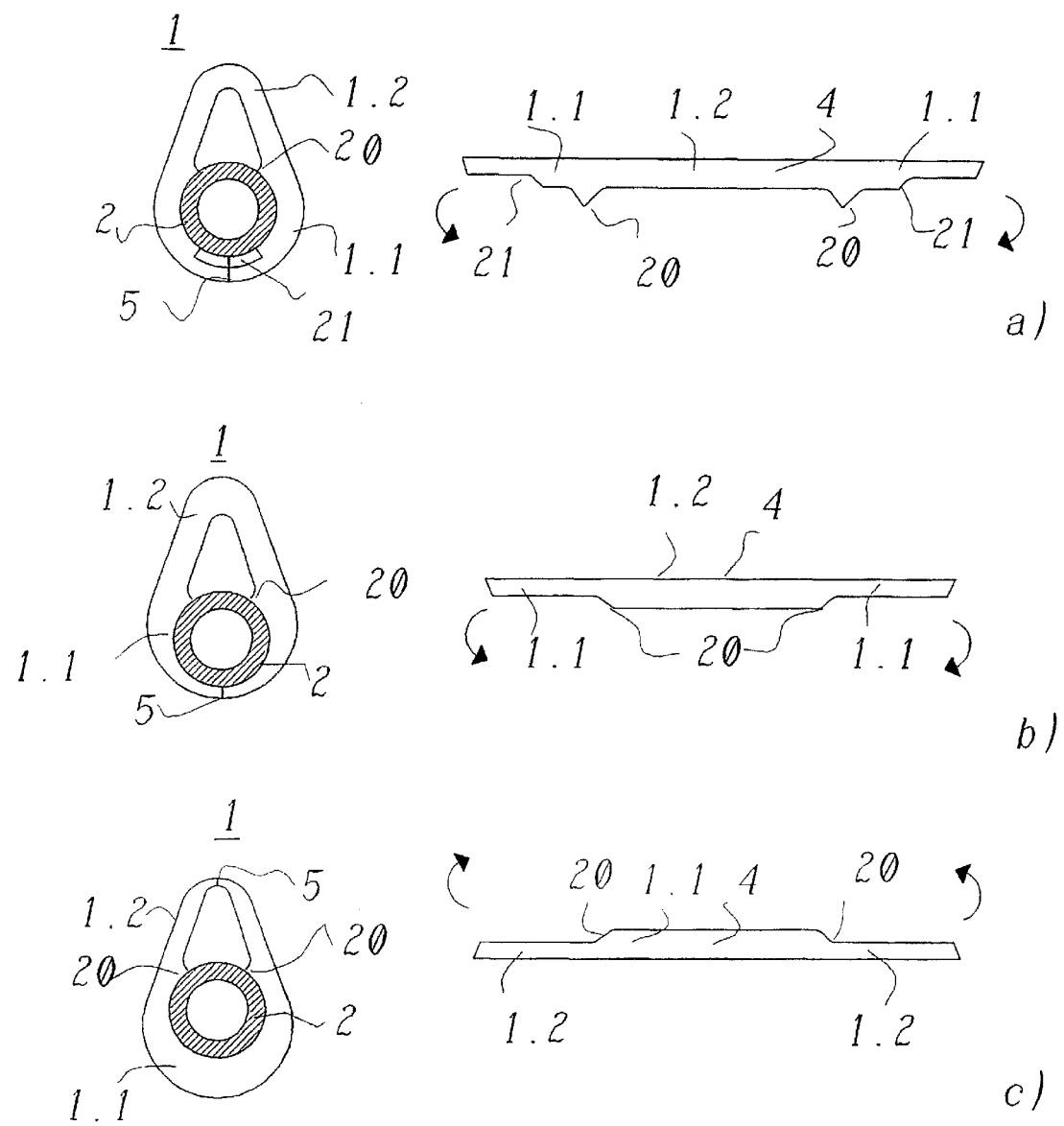
FIG. 7 shows, under a)–c), three different cams according to the invention, together with the not yet bent profile strips associated with them in each case.

FIG. 7 shows, under a)–c), three further exemplary embodiments of cams 1 according to the invention, together with their not yet bent profile strips 4 associated with them in each case. In all three examples, an inwardly projecting shoulder 20 more closely surrounding the shaft 2 is formed in the transitional region between the portions 1.1 and 1.2.

In the embodiment shown under a), there is additionally provided in the joint region 5 a weld-seam recess 21 which can receive within it the welding bead possibly occurring during the welding of the profile strip ends. This affords the advantage that, after welding, a smooth cam surface structure is obtained relative to the outside and therefore there is no need for subsequent grinding of the surface after welding.

The cam illustrated under b) has, in the length portion 1.2 projecting from the shaft 2, a greater wall thickness than in the length portion 1.1, thus giving the length portion 1.1 greater stability.

The cam illustrated under c) has, conversely, a smaller wall thickness in the length portion 1.2 than in the length portion 1.1. In addition, here, the joint region 5 of the two profile strip ends is shifted upward into the region of the length portion 1.2, this merely being a further possibility for placing said joint region on the circumference of the cams.

Figure 8:
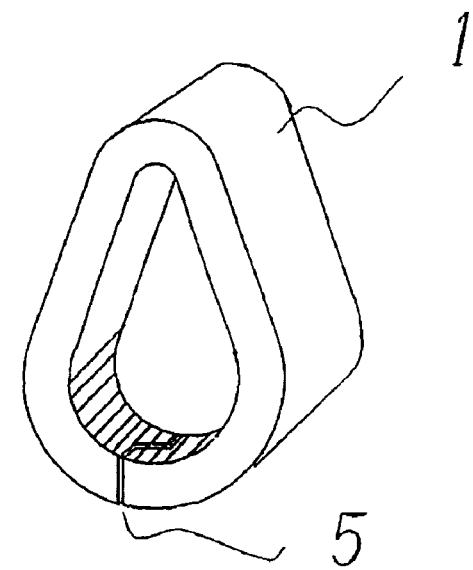
FIG. 8 shows a further cam with overlapping ends.

In the embodiment of a cam 1, as illustrated in FIG. 8, the two profile strip ends are designed, with a view to a further variant, so as to overlap, specifically so as to overlap in the axial direction, although an overlap in the radial direction would also be possible. An overlap in the axial direction has the advantage, however, that, on the one hand, the two ends can be brought into mutual, if appropriate elastically slightly prestressed axial bearing contact on one another even when the profile strip is being bent together and consequently are reliably in alignment with one another. On the other hand, the joint 5 is then not overrun even once during the rolling of the cam, so that a groove which may possibly be present in the joint region and, if appropriate, may even be necessary for tolerance reasons on the outside of the cam does not have an adverse effect.

Figure 4:
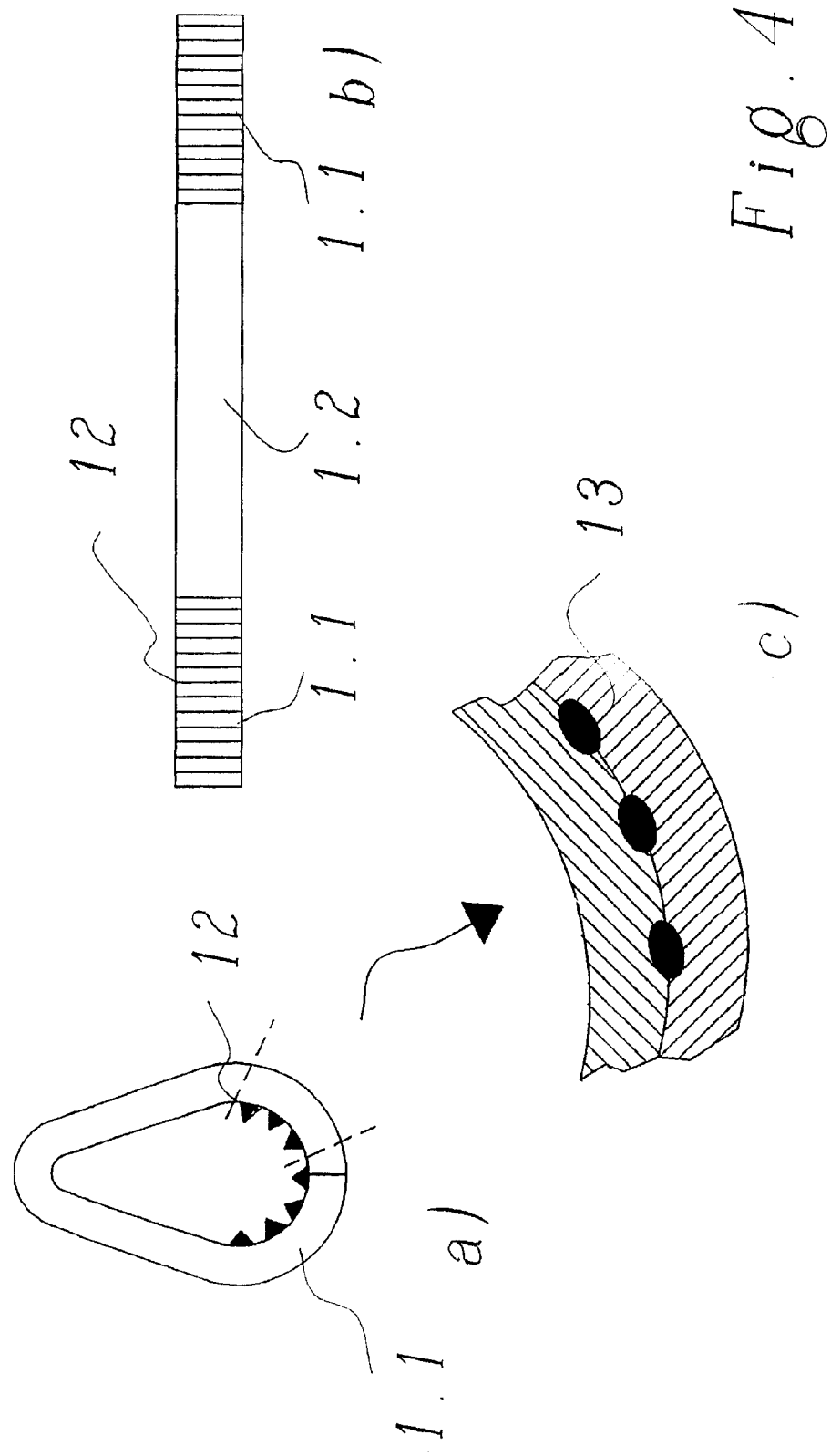
FIG. 4 shows, under a), in a side view, a cam with ribs attached on the inside, under b), in a top view, a still straight profile strip with ribs already at least partially attached, and, under c), in an enlargement of a detail, a circumferential portion of the shaft and of the cam with a plurality of weld seams capable of being produced by means of the resistance welding method.

In the cam of FIG. 8, inwardly projecting ribs are also formed in its portion 1.1 coming to bear on the shaft, such as are likewise already described as advantageous in connection with resistance welding and are illustrated in FIG. 4 under a) and b). These ribs can advantageously also be used for producing mechanical intermeshing between the cam and the shaft. For this purpose, the cam is applied in the still open state, that is to say with the ends not yet welded to one another, onto the shaft and is acted upon there, in position, by pressure from outside in such a way that the ribs are pressed into the shaft and said intermeshing occurs at the same time. So that this is possible, the ribs must, if appropriate, be prehardened. When the ribs are oriented in the axial direction, this advantageously results in a rotational fixing of the cam on the shaft. The cam can subsequently be welded to the shaft in one of the ways described above.

Owing to the intermeshing, a welding of the cam to the shaft is, if appropriate, even superfluous, and it is sufficient solely to close the cam by the welding of its two ends. If these are in this case fused under pressure, for example by laser, the cam, to further advantage, also additionally contracts during the resolidification of the fused material and firmly closes around the shaft, because the density of liquid metal is lower than the density of solid metal.

Figure 9:
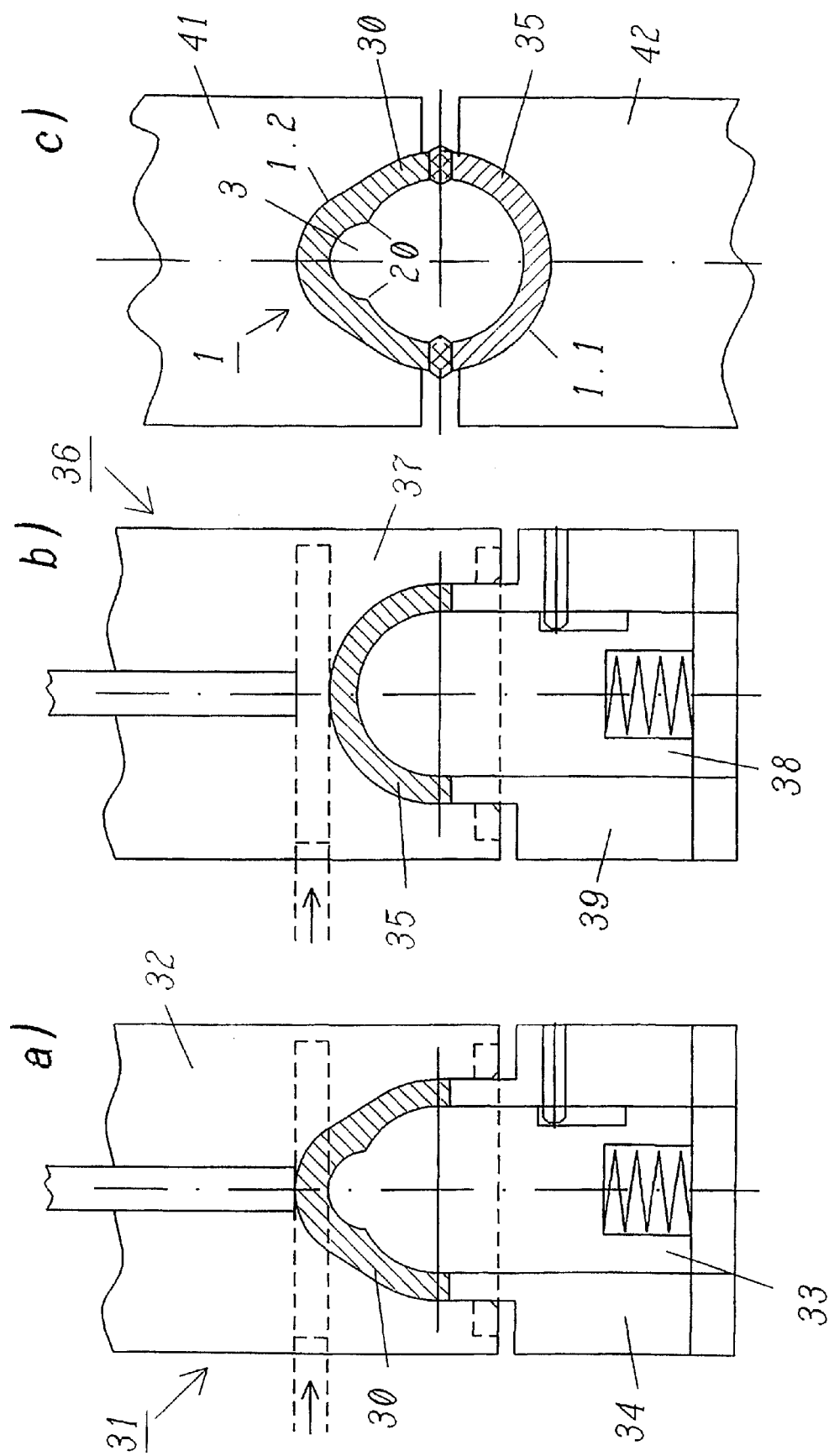
FIG. 9 shows, under a)–c), the steps for producing a cam according to the invention composed of two bent profile strips.

FIG. 9 also shows, under a)–c), the steps for producing a cam 1 according to the invention composed of two bent profile strips 30, 35. FIG. 9a) illustrates in this case a profile strip 30 already finish-bent into an upper cam half comprising the cam elevation or cam tip, in a bending tool 31 which comprises an upper forming die 32, a lower forming die 33 and a precision stop 34. Correspondingly, FIG. 9b) shows a profile strip 35 complementary to the profile strip 31 and likewise already finish-bent into a lower cam half, in a bending tool 36, of which the upper forming die is designated by 37 and the lower forming die by 38 and of which the precision stop is designated by 39. In FIG. 9c), the two semicircular or halfshell-shaped cam halves are assembled between two welding electrodes 41 and 42 into a closed ring and are connected to one another by means of these electrodes by resistance welding also at their mutual contact faces.

In terms of their cross-sectional shape, the cam of FIG. 9c) corresponds approximately to that of FIG. 7a), that is to say it has in each case a shoulder 20 in the transitional region between its length portion 1.1, with which it comes to bear on the shaft, and its length portion 1.2, in which it projects from the shaft. The embossing of these shoulders 20 may take place before bending on the still straight profile strip 30, but advantageously also only in the bending tool 31 during bending. All other above-described cam shapes and cam designs can, of course, likewise be produced from a plurality of profile strip pieces, and the cams do not necessarily have to be composed of an upper and lower half. In particular, they could also be composed of two identical left and right halves, with the result that even a bending tool would then be dispensed with. Further, it would be possible to use solid cams, that is to say those cams which surround the shaft on all sides and have no cavity 3 (FIG. 1). A construction of the cams from more than two parts would, in principle, likewise be conceivable.

The method described has the advantage, as compared with those described above, that the two profile strips 31 and 35 do not have to be bent to such an extent separately in each case and, therefore, the material is exposed to a lower load during cam production. Also, at least the bending tools become simpler in terms of their design.

LIST OF DESIGNATIONS

1 Cam
1.1 First length portion
1.2 Second length portion
2 Shaft
3 Cavity
4 Profile strip
5 Joint
6 Bending tool
7 Bending core
7.1 Rotatable part of the bending core
8.1 First bending finger
8.2 Second bending finger
8.3 Third bending finger
8.4 Fourth bending finger
9 Resistance welding arrangement
10 Welding electrodes
11 Counterelectrodes
12 Ribs
13 Weld seams
14 Laser or electron welding beam
15 Grooves
16 Foot strip
17 Foot strip
18 Welding heads
19 Axis
20 Shoulder
21 Weld-seam recess
30 Profile strip
31 Bending tool
32 Upper forming die
33 Lower forming die
34 Precision stop
35 Profile strip
36 Bending tool
37 Upper forming die
38 Lower forming die
39 Precision stop
41 Welding electrode
42 Welding electrode

What is claimed is:

1. A method for producing a cam (1) for a camshaft which comprises a cylindrical shaft (2) and a plurality of cams (1) fixed on the latter, characterized in that the cam (1) is produced from a plurality of profile strip pieces (30, 35) by these pieces being bent and assembled in the circumferential direction.

2. The method as claimed in claim 1, characterized in that the profile strips (30, 35) are bent in such a way that the profile strips come to bear with at least one first length portion (1.1) on the shaft (2) and project with at least one second length portion (1.2) from the shaft (2).

3. The method as claimed in claim 1, characterized in that the profile strips (30, 35) are bent in such a way that ends of said profile strips butt one against the other so as to overlap, and in that, for this purpose, the ends, before being bent together, are suitably shaped.

4. The method as claimed in claim 2, characterized in that the first length portion (1.2) of the profile strips (30, 35) is provided, on the inside of the first length portion (1.2) coming to bear on the shaft, with ribs (12).

5. The method as claimed in claim 4, characterized in that the ribs (12) are hardened, and that the ribs (12) are designed in such a way that, in the bent-together state, the ribs (12) run in the axial direction or form a thread.

6. The method as claimed in claim 2, characterized in that a shoulder (20) projecting inward in the bent-together state is formed in the transitional region between the at least one first length portion (1.1) and the at least one second length portion (1.2).

7. The method as claimed in claim 6, characterized in that the cam (1) is provided in the joint region of the ends of the profile strips (30, 35) with a weld-seam recess (21).

8. The method as claimed in claim 7, characterized in that the profile strips (30, 35) are provided laterally, at least along the first length portion (1.1) of the profile strips (30, 35), with a foot strip (16, 17).

9. The method as claimed in claim 4, characterized in that the ribs (12) or the shoulder (20) or the weld-seam recess (21) or the foot strip (16, 17) are produced at least partially by rolling before the bending of the profile strips (30, 35).

10. The method as claimed in claim 1, characterized in that the profile strips (30, 35) are bent by a bending core (7; 33, 38).

11. The method as claimed in claim 8, characterized in that the ribs (12) and/or the shoulder (20) and/or the weld-seam recess (21) and/or the foot strip (16, 17) are produced at least partially during the bending of the profile strips (30, 35).

12. The method as claimed in claim 10, characterized in that each of the profile strips (30, 35) has at least one first portion (1.1), the bending core (7) used is one which has a rotationally symmetric rotatable part (7.1) for cooperation with the at least one first portion (1.1) of one of the profile strips (30, 35), said rotatable part (7.1) being provided with an external thread, and in that this rotatable part is released from the profile strip by unscrewing after the latter has been bent together.

13. The method as claimed in claim 1, characterized in that the ends of the profile strips (30, 35) are connected to one another by laser welding or resistance welding.

14. The method as claimed in claim 13, characterized in that the welding of the ends of the profile strips (30, 35) is carried out in such a way that a weld-seam recess (21) in the joint region of the ends of the profile strips (30, 35) receives within the weld-seam recess (21) the welding bead which may possibly occur at the same time.

15. The method for producing a cam shaft, using at least one cam (1), as claimed in claim 1,
characterized in that the cam (1) is fixed on a shaft (2) by welding.

16. The method as claimed in claim 15, characterized in that welding is carried out, without the application of additional material, by laser or electron-beam welding.

17. The method as claimed in claim 16, using a cam (1) provided with a foot strip (16, 17), characterized in that the cam (1) is welded to the shaft (2) along said foot strip (16, 17) and through the latter.

18. The method as claimed in claim 15, characterized in that the cam (1) is prefixed in a desired position on the shaft (2) before welding, by a thermal shrink fit, by the application of internal high pressure in the case of a tubular shaft or by means of a dimensional or configural locally limited form-locking connection.

19. The method as claimed in claim 15, characterized in that a plurality of cams (1) are applied to the shaft (2) in succession, but are welded to the shaft (2) simultaneously.

20. The method as claimed in claim 15, characterized in that the cam (1) is welded to the shaft (2) by the resistance welding method, the cam (1) being held in a desired position on the shaft (2).

21. The method as claimed in claim 20, wherein the cam (1) is provided with ribs (12) on the inside of the cam coming to bear on the shaft, characterized in that, during welding, pressure is exerted on the cam (1) by the at least one welding electrode (10), in such a way that the ribs (12) are fused away as a result of the welding operation.

22. The method as claimed in claim 15, wherein the cam (1) is provided with ribs (12) on the inside of the cam coming to bear on the shaft, characterized in that, before welding, pressure is exerted on the cam (1) in such a way that the ribs (12) of the cam (1) are pressed into the shaft (2) and mechanical intermeshing between the cam (1) and the shaft (2) occurs.

23. The method as claimed in claim 20, characterized in that the cam (1) is being held in the desired position on the shaft (2) by at least one of welding electrode (10).

24. A method for producing a cam (1) for a camshaft which comprises a cylindrical shaft (2) and a plurality of cams (1) fixed on the latter,
wherein the cam (1) is produced from at least one elongate profile strip (4) by the ends of the latter being bent together or from a plurality of profile strip pieces (30, 35) by these pieces being bent and assembled in the circumferential direction, and wherein the profile strip/profile strips (4; 30, 35) is/are bent by a bending core (7; 33, 38),
characterized in that the bending core (7) used is one which has a rotationally symmetric rotatable part (7.1) for cooperation with the at least one first portion (1.1) of the profile strip (4), said rotatable part (7.1) being provided with an external thread, and in that this rotatable part is released from the profile strip (4) by unscrewing after the latter has been bent together.

25. A method for producing a cam (1) for a camshaft which comprises a cylindrical shaft (2) and a plurality of cams (1) fixed on the latter,
wherein the cam (1) is produced from at least one elongate profile strip (4) by the ends of the latter being bent together or form a plurality of profile strip pieces (30, 35) by the pieces being bent and assembled in the circumferential direction,
characterized in that the profile strips/strips (4: 30, 35) is/are bent ion such a way that its/their ends butt one on the other over their entire area and in that, for this purpose, the ends, before being bent together, are suitably shaped.

26. The method as claimed in claim 25, characterized in that the profile strip/profile strips (4: 30, 35) is/are bent in such a way that if they comes/come to bear with at least one first length portion (1.1) on the shaft (2) and projects/project with at least one second length portion (1.2) from the shaft (2).

27. The method as claimed in claim 26, characterized in that the first length portion (1.1) of the profile strip/profile strips (4; 30, 35) is provided, on its inside coming to bear on the shaft, with ribs (12).

28. The method as claimed in claim 27, characterized in that the ribs (12) are hardened, and that the ribs (12) are designed in such a way that, in the bent-together state, they run in the axial direction or form a thread.

29. The method as claimed in claim 26, characterized in that a shoulder (20) projecting inward in the bent-together state is formed in the transitional region between the at least one first length portion (1.1) and the at least one second length portion (1.2).

30. The method as claimed in claim 29, characterized in that the cam (1) is provided in the joint region of the ends of the profile strip/profile strips (4: 30, 35) with a weld-seam recess (21).

31. The method as claimed in claim 30, characterized in that the profile strip/profile strips (4; 30, 35) is/are provided laterally, at least along its/their first length portion (1.1), with a foot strip (16, 17).

32. The method as claimed in claim 31, characterized in that the ribs (12) and/or the shoulder (20) and/or the weld-seam recess (21) and/or the foot strip (16, 17) are produced at least partially by rolling before the bending of the profile strip/profile strips (4; 30, 35).

33. The method as claimed in claim 25, characterized in that the profile strip/profile strips (4; 30, 35) is/are bent by a bending core (7; 33. 38).

34. The method as claimed in claim 31, characterized in that the ribs (12) and/or the shoulder (20) and/or the weld-seam recess (21) and/or the foot strip (16, 17) are produced at least partially during the bending of the profile strip/profile strips (4; 30, 35).

35. The method as claimed in claim 33, characterized in that the bending core (7) used is one which has a rotationally symmetric rotatable part (7.1) for cooperation with the at least one first portion (1.1) of the profile strip (4), said rotatable part (7.1) being provided with an external thread, and in that this rotatable part is released from the profile strip (4) by unscrewing after the latter has been bent together.

36. The method as claimed in claim 25, characterized in that the ends of the profile strip/profile strips (4; 30, 35) are connected to one another laser welding or resistance welding.

37. The method as claimed in claim 36,
characterized in that the welding of the ends of the profile strip/profile strips (4; 30, 35) is carried out in such a way that a weld-seam recess (21) in the joint region of the ends of the profile strip/profile strips (4; 30. 35) receives within it the welding bead which may possibly occur at the same time.

38. A method for producing a cam (1) for a camshaft which comprises a cylindrical shaft (2) and a plurality of cams (1) fixed on the latter, wherein the cam (1) is produced from at least one elongate profile strip (4) by the ends of the latter being bent together or from a plurality of profile strip pieces (30, 35) by these pieces being bent and assembled in the circumferential direction, characterized in that a shoulder (20) projecting inward in the bent-together state is formed in the transitional region between the at least one first length portion (1.1) and the at least one second length portion (1.2) by means of a variation in the thickness of the profile strip/profile strips (4, 30, 35).

39. The method as claimed in claim 38, characterized in that the profile strip/profile strips (4: 30. 35) is/are bent in such a way that it comes/they come to bear with at least one first length portion (1.1) on the shaft (2) and projects/project with at least one second length portion (1.2) from the shaft (2).

40. The method as claimed in claim 38, characterized in that the profile strip/strips (4; 30, 35) is/are bent in such a way that its/their ends butt one on the other over its/their area or butt one against the other so as to overlap, and in that, for this purpose, the ends, before being bent together, are suitably shaped.

41. The method as claimed in claim 39, characterized in that the first length portion (1.2) of the profile strip/profile strips (4; 30, 35) is provided, on its inside coming to bear on the shaft, with ribs (12).

42. The method as claimed in claim 41, characterized in that the ribs (12) are hardened, and that the ribs (12) are designed in such a way that, in the bent-together state, they run in the axial direction or form a thread.

43. The method as claimed in claim 39, characterized in that a shoulder (20) projecting inward in the bent-together state is formed in the transitional region between the at least one first length portion (1.1) and the at least one second length portion (1.2).

44. The method as claimed in claim 43, characterized in that the cam (1) is provided in the joint region of the ends of the profile strip/profile strips (4; 30, 35) with a weld-seam recess (21).

45. The method as claimed in claim 44, characterized in that the profile strip/profile strips (4: 30, 35) is/are provided laterally, at least along its/their first length portion (1.1), with a foot strip (16, 17).

46. The method as claimed in claim 45, characterized in that the ribs (12) and/or the shoulder (20) and/or the weld-seam recess (21) and/or the foot strip (16, 17) are produced at least partially by rolling before the bending of the profile strip/profile strips (4: 30, 35).

47. The method as claimed in claim 38, characterized in that the profile strip/profile strips (4; 30, 35) is/are bent by a bending core (7; 33, 38).

48. The method as claimed in claim 45, characterized in that the ribs (12) and/or the shoulder (20) and/or the weld-seam recess (21) and/or the foot strip (16, 17) are produced at least partially during the bending of the profile strip/profile strips (4; 30. 35).

49. The method as claimed in claim 47, characterized in that the bending core (7) used is one which has a rotationally symmetric rotatable part (7.1) for cooperation with the at least one first portion (1.1) of the profile strip (4), said rotatable part (7.1) being provided with an external thread, and in that this rotatable part is released from the profile strip (4) by unscrewing after the latter has been bent together.

50. The method as claimed in claim 38, characterized in that the ends of the profile strip/profile strips (4; 30, 35) are connected to one another by laser welding or by resistance welding.

51. The method as claimed in claim 50, characterized in that the welding of the ends of the profile strip/profile strips (4: 30, 35) is carried out in such a way that a weld-seam recess (21) in the joint region of the ends of the profile strip/profile strips (4; 30, 35) receives within it the welding bead which may possibly occur at the same time.

52. The method as claimed in claim 1, wherein said plurality of profile strip pieces are assembled end to end 360 degrees around the cylindrical shaft (2).

53. The method as claimed in claim 1, characterized in that the profile strips (30, 35) are bent in such a way that ends of said profile strips butt one on the other over their area, and in that for this purposes, the ends, before being bent together, are suitably shaped.

* * * * *